Sept. 15, 1970         D. E. STEIN ET AL         3,528,586
GRAVIMETRIC FEEDER

Filed Dec. 21, 1967         3 Sheets-Sheet 1

INVENTORS.
DONALD E. STEIN
KENNETH W. BULLIVANT
ROBERT H. BECKETT

BY

ATTORNEYS.

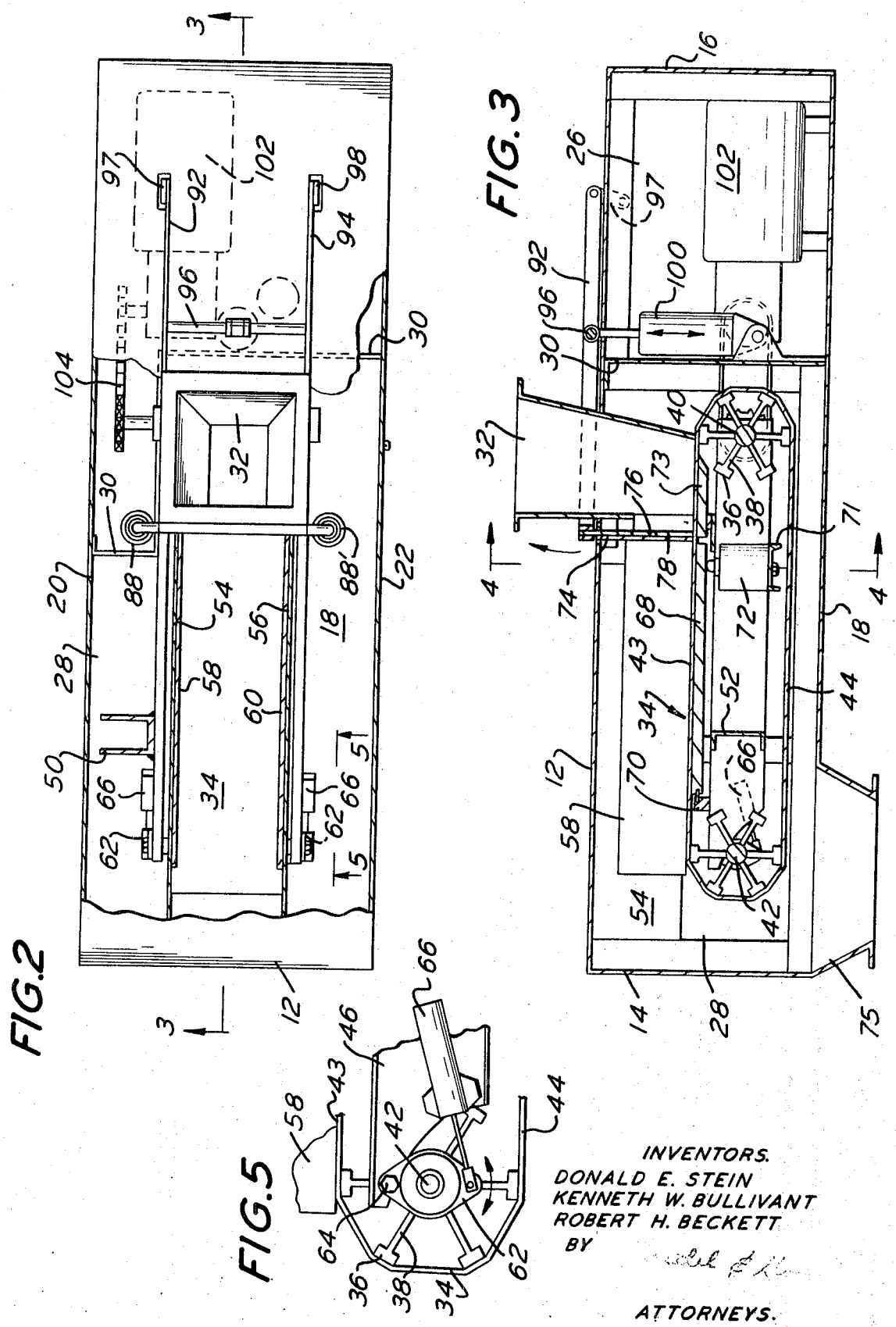

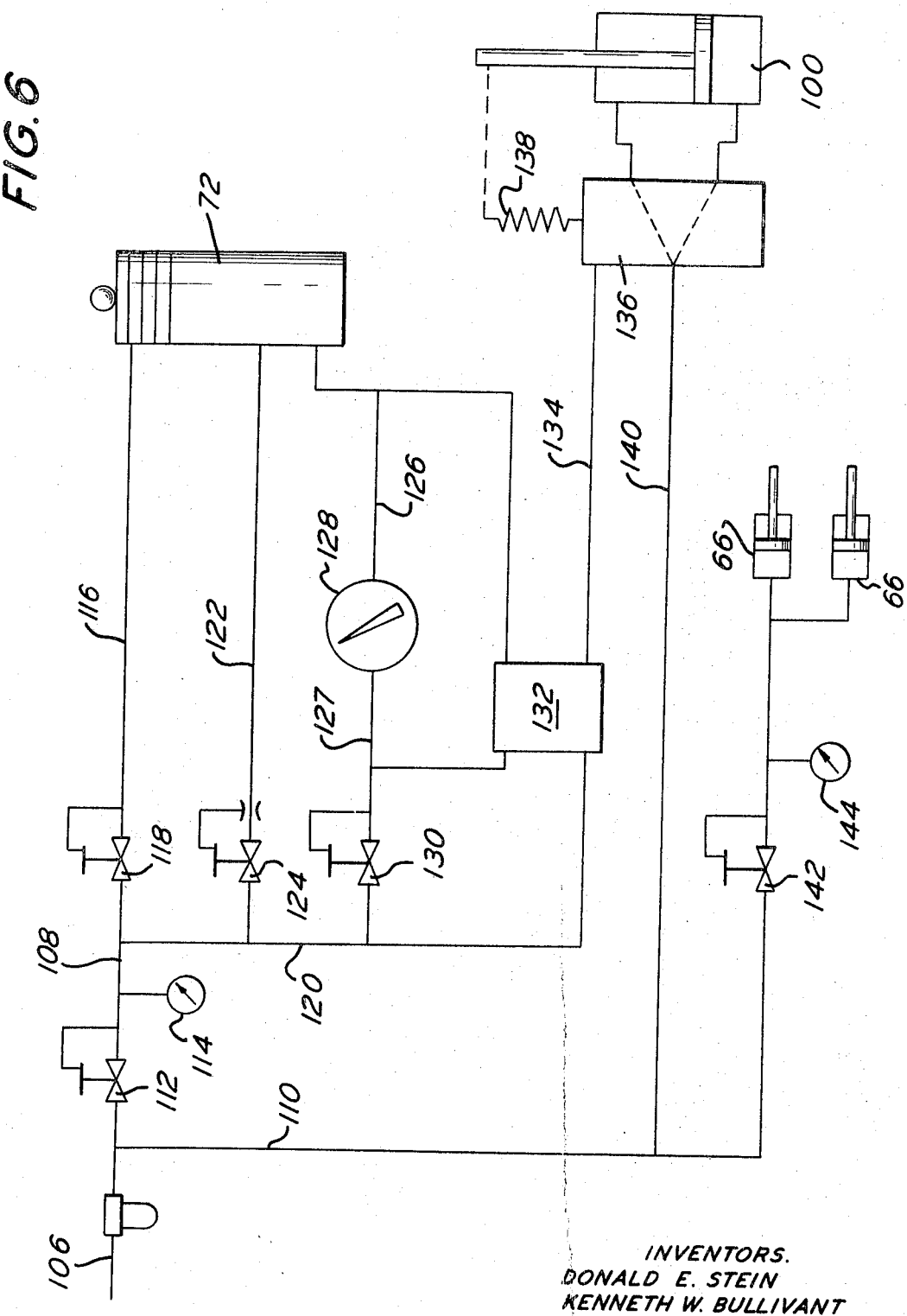

United States Patent Office 3,528,586
Patented Sept. 15, 1970

3,528,586
GRAVIMETRIC FEEDER
Donald E. Stein, Millville, and Kenneth W. Bullivant, Pitman, N.J., and Robert H. Beckett, Dresher, Pa., assignors to Kane Air Scale Company, Glassboro, N.J., a corporation of New Jersey
Filed Dec. 21, 1967, Ser. No. 692,470
Int. Cl. B67d 5/08
U.S. Cl. 222—55       9 Claims

ABSTRACT OF THE DISCLOSURE

A gravimetric constant feed belt feeder is provided for continuously feeding and weighing dry granular material. A belt is supported by a weighing table in the form of a plate which is pivoted at one end and supported at its other end by a pneumatic weight transmitter. The transmitter generates a signal indicative of load changes. The signal is used to control a gate valve which controls discharge from an inlet hopper to the belt.

---

Gravimetric feeders are well known. Typical gravimetric feeders are shown in U.S. Pats. 2,637,434 and 2,889,030. A gravimetric belt feeder is considered to be the most reliable way of continuously weighing dry granular materials. The gravimetric feeder of the present invention is more accurate, has a quicker response to changes in the feed rate, is less sensitive to vibration, and is easier to adjust and maintain than those used heretofore.

The interior of the feeder of the present invention is divided into a belt chamber and a control chamber separated by a dust-tight partition. The motor, valve member operating cylinder, controller, and gauges are located in the control chamber. A bottomless inlet hopper delivers dry granular material onto the endless belt in the belt chamber behind a valve member. When the valve member is raised, the material is carried by the belt to an outlet hopper. The belt has its upper run supported by a weighing table. The weighing table is in the form of a plate pivoted at one end supported at its other end by a pneumatic weight transmitter. The weight transmitter is located immediately adjacent the valve member for rapid response to load changes.

The weight transmitter senses load changes and provides a proportional pneumatic signal to a controller. The output of the controller operates a cylinder for positioning the valve member. The exact position of the valve member is constantly detected. The feed rate is easily changed by adjusting a set point regulator. The belt tension and the belt tracking are easily adjusted by means of pneumatic cylinders. The pneumatic cylinders, set point regulator, and tare weight are conveniently adjusted at a control panel.

When it is desired to change the volumetric capacity due to a change of the material being processed, it is only necessary to change the belt speed or the size of the aperture in the valve plate. Gravimetric capacity may be changed by adjusting the weight transmitter. Errors due to friction are minimized by using ball bushings to guide movement of the valve member. Friction is also reduced by using a double acting rolling diaphragm type cylinder operator for the valve member.

It is an object of the present invention to provide a novel gravimetric feeder which is versatile, simple, reliable and accurate.

It is another object of the present invention to provide a gravimetric feeder which is easy to maintain and operate.

It is another object of the present invention to provide a gravimetric feeder with pneumatic means for adjusting belt tension and belt tracking, adjustable from a control panel.

It is another object of the present invention to provide a gravimetric feeder having a control panel constructed to permit adjustment of the set point regulator and tare weight.

It is another object of the present invention to provide a gravimetric feeder having improved accuracy.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a top plan view of the feeder shown in FIG. 1, with portions broken away for purposes of illustration.

FIG. 3 is a sectional view taken along the line 3—3 in FIG. 2.

FIG. 5 is an enlaged detail view of the left-hand end of the belt shown in FIG. 3.

FIG. 6 is a schematic diagram showing the circuitry used in the feeder of the present invention.

Figure 1:
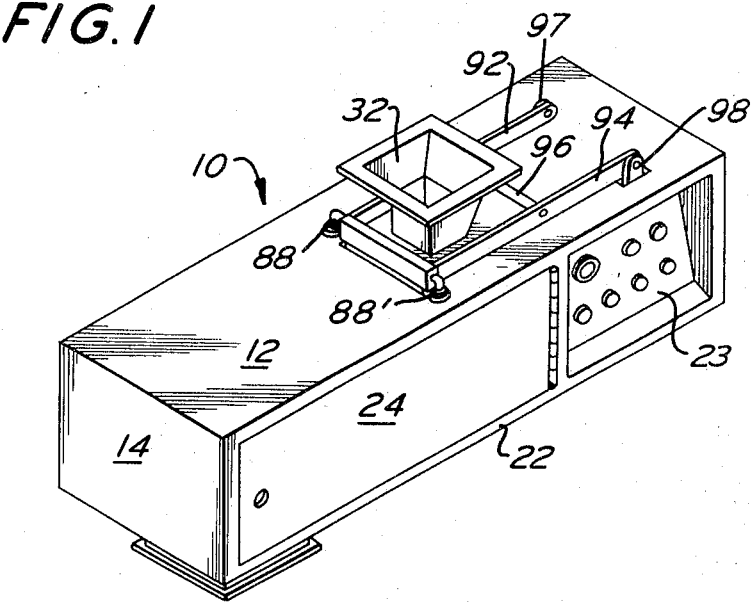
FIG. 1 is a perspective view of the feeder of the present invention.

Referring to the drawing in detail, wherein like numerals indicate like elements, there is shown in FIG. 1 a gravimetric feeder in accordance with the present invention designated generally as 10. Feeder 10 includes a unitized housing having a top wall 12, end walls 14 and 16, and bottom wall 18, and removable side walls 20 and 22. Side wall 22 includes an instrument panel 23 and a pivotably mounted door 24.

The interior of the housing is divided into a control chamber 26 and a belt chamber 28 separated by a dust-tight partition 30. Dry granular materials may be introduced into the housing by way of an inlet hopper 32. Hopper 32 is bottomless and permits the dry granular material to fall directly onto endless belt 34. Belt 34 extends around roller means lacking a continuous surface.

Thus, the roller means for the belt 34 includes arcuate segments 36 at the end of spokes 38. The roller means includes a first driven hub 40 and a second idling hub 42. The driven hub 40 is below the hopper 32. Belt 34 includes a top run 43 and a bottom run 44.

Figure 4:
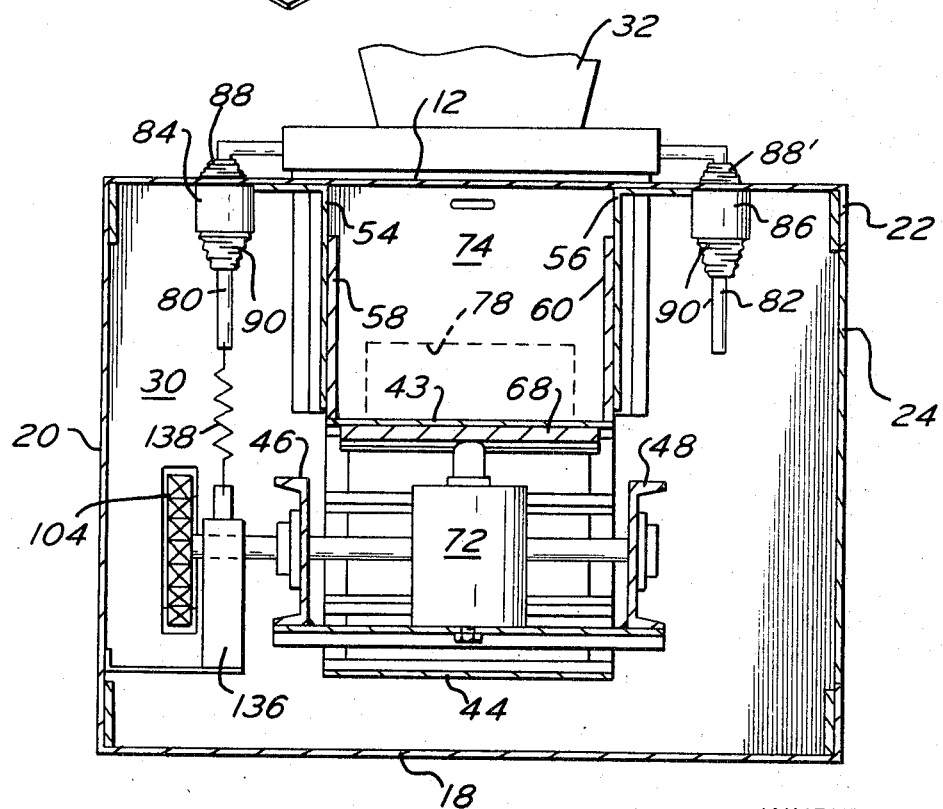
FIG. 4 is a sectional view taken along the line 4—4 in FIG. 3.

The hubs 40 and 42 are supported from a frame including channel or angle irons 46 and 48 as shown more clearly in FIG. 4. The frame is supported only from partition 30 of the housing and a plurality of vertical columns 50, only one of which is shown in FIG. 2. Angle irons 46 and 48 are interconnected by cross braces 52. See FIG. 3.

As shown more clearly in FIG. 4, panels 56 and 56 are provided and are supported by partition 30 and walls 14, 16. A material guide 58 is adjustably supported by panel 54. A similar guide 60 is supported by panel 56. The guides 58 and 60 ride close to the upper surface of the belt 34 and prevent granular materials from falling off the side edges of the belt 34.

As shown more clearly in FIG. 5, the hub 42 is supported at its ends by supports 62. Each support 62 is pivotably supported by one of the angle irons 46 and 48 adjacent their upper ends for rotation about pin 64.

A pneumatic cylinder 66 is provided on opposite sides of the frame, one such cylinder being supported by angle iron 46 and the other being supported by angle iron 48. The piston rods extending from the pneumatic cylinder 66 are connected to one of the supports 62. The cylinders 66 facilitate adjusting the tension of the belt 34 and the tracking of the belt 34.

The top run 43 of the belt 34 is supported by a weighing table. The weighing table includes a plate 68 pivotably supported at its lefthand end in FIG. 3 by a pair of flexible leaf springs on a cross bar 70. Bar 70 extends between the angle irons 46 and 48. The righthand end portion of plate 68 is supported by a pneumatic weight transmitter 72. Pneumatic weight transmitter 72 is preferably of the type disclosed in copending patent application Ser. No. 561,872 filed on June 30, 1966, and sold commercially by the Kane Air Scale Company of Glassboro, N.J. The disclosure in said application is incorporated herein by reference. Transmitter 72 is supported on a cross-brace 71 extending between the angle irons 46 and 48 of the belt frame and adjustable with respect thereto so that the transmitter may be moved toward and away from the free end of plate 68. Such adjustment varies weighing range. A support plate 73 is provided beneath the top run 43 of the belt 34 immediately below the hopper 32. Plate 73 is likewise supported by the angle irons 46 and 48.

The granular material in the hopper 32 is prevented from being delivered to the outlet hopper 75 by the belt 34 due to a valve member 74 and a plate 76. Valve member 74 is an imperforate sliding gate valve member. Plate 76 is provided with a rectangular aperture 78 as shown more clearly in FIGS. 3 and 4. Plate 76 is stationary and replaceable when a different sized opening 78 is desired. Valve member 74 is supported for vertical movement.

A reinforced portion at the upper edge of valve member 74 is provided with outwardly and downwardly extending rods 80 and 82. Rod 80 extends through a ball bushing 84 which guides the valve member for vertical movement with minimum friction. Rod 82 is similarly guided by ball bushing 86. Bellows seals 88 and 90 are provded between rod 80 and bushing 84 to prevent dust from entering the bushing 84. Similar seals 88' and 90' are provided for the rod 82 and bushing 86.

Linkage is provided for causing the valve member 74 to move up and down in a vertical plane. Such linkage includes side rods 92 and 94 each pivotably connected to one end of the valve member 74. The rods 92 and 94 are interconnected by a bar 96. The end of the rod 92 remote from the valve member 74 is pivotably connected to a link 97. The end of rod 94 remote from the valve member 74 is pivotably connected to a link 98. The links 97 and 98 are each pivotably connected to the housing of the feeder 10 at a point below the level of the rods 92 and 94.

An actuating cylinder 100 is provided. The lower end of cylinder 100 is pivotably connected to the partition 30 and is physically located within the control chamber 26. The piston rod on cylinder 100 is pivotably connected to the bar 96 for causing the rods 92 and 94 to pivot while valve member 74 moves vertically.

A constant speed synchronous reluctance motor drive 102 is mounted within the control chamber 26. Motor drive 102 is coupled to the hub 40 by means of sprockets and chain 104. The remaining elements of the feeder of the present invention are more conveniently described in conjunction with the circuitry illustrated in FIG. 6.

The circuitry in FIG. 6 includes a supply conduit 106 containing a filter. Conduit 106 is in communication with conduits 108 and 110. Conduit 108 includes a supply pressure regulator 112 having a gauge 114. Gauge 114 is visible on control panel 23.

Conduit 108 is in communication with conduits 116 and 120. Conduit 116 includes a tare weight pressure regulator 118. Conduit 116 communicates with the tare chamber in the pneumatic weight transmitter 72. A conduit 122 provides communication between conduit 120 and the net load chamber of the weight transmitter 72. An outlet responsive flow regulator 124 is provided in conduit 122 for regulating the flow of pressurized air delivered to the net load chamber of transmitter 72.

A conduit 126 communicates at one end with the net load chamber in transmitter 72. The other end of conduit 126 is coupled to a duplex gauge 128. A conduit 127 extends between conduit 120 and the duplex gauge 128. A set point pressure regulator 130 is provided in conduit 127. Gauge 128 is located at the control panel 23 and simultaneously exhibits the pressures in conduits 126 and 127.

A dual action controller 132 is provided. Controller 132 is, per se, old in the art and commercially available. Controller 132 is coupled at one end to the conduits 126 and 127. One end of conduit 120 is coupled to controller 132. As a result of the comparison of the pressures in conduits 126 and 127, controller 132 modifies the pressure signal from conduit 120 and transmits the same by way of conduit 134 to positioner 136. Positioner 136 is also shown in FIG. 4 and is coupled by spring 138 to the rod 80. Positioner 136 compares the signal of spring 138 with the signal in conduit 134 and as a function thereof, repositions a four-way supply and exhaust valve for directing pressurized air from conduit 140 to the opposite ends of the cylinder 100.

Pressurized air in conduit 110 communicates directly with the pneumatic cylinders 66 for controlling the tracking of the belt and the tension of the belt. An adjustable pressure regulator 142 having a gauge 144 controls the pressure delivered to the cylinder 66. Gauge 144 is located on the control panel 23 so that the pressure exerted on the cylinders 66 may be continuously exhibited. Each of the cylinders 66 is adjustably mounted on the belt frame so that the cylinders may be moved toward and away from the support 62 to facilitate adjustment of belt tracking.

The door 24 facilitates access to the components in the belt chamber 28. By removing all pressure on the cylinders 66, the belt 34 may be removed by pulling the same through the door 24. Due to the cantilever support of the belt frame, the belt may be quickly and easily removed without dismantling other components.

All parts which come in contact with the dry granular material except for the belts, such as the inlet hopper 32, the gate valve member 74, guides 58 and 60, are preferably made from stainless steel. The belt 34 is preferably made from rubber or other materials depending upon the nature of the granular materials being processed.

The set point pressure regulator 130 is adjusted to the desired position depending upon the flow rate desired. Pressure introduced into the tare weight chamber of the weight transmitter 72 by way of conduit 116 offsets the weight of the belt 34 and the plate 68. Weight transmitter 72 is immediately adjacent the free end portion of plate 68 since this is the region of maximum sensitivity to weight. The belt 34 carries the dry granular material from the inlet hopper 32 to the outlet hopper 75. The volumetric capacity of the granular material carried by the belt is a function of the height of the lower edge of the valve member 74 and the width of the opening 78.

The pneumatic weight transmitter 72 immediately senses the weight of the granular material supported by the weighing table. Controller 132 will continuously feed a signal through conduit 134 to cause the piston in cylinder 100 to move upwardly until the pressure in the net load chamber of weight transmitter 72 balances out the pressure in conduit 127. Any deviations from the desired feed rate are continuosly measured by the weight transmitter 72. Corrections in the position of the valve member 74 are immediately effected by any unbalance between the pressure in conduit 127 and the pressure in the net load chamber of transmitter 72.

The belt 34 is constantly subjected to flapping by the contact between the belt and the segments 36 of the roller means. The flapping of the belt is desired to facilitate continuous self-cleaning of the belt. The flapping of the belt 34 is substantially dampened by the belt frame so that the weight transmitter 72 is unaffected by the flapping. It is surprising that an accurate continuous measurement could be obtained even though the belt is subjected to disturbances in tension due to flapping as a result of the self-cleaning operation.

It is important to the proper functioning of the feeder 10 that the belt 34 be driven at a constant speed by the motor drive 102. As a result thereof, the gauge 128 may be calibrated to read the weight of the material being measured in pounds per minute or any other weight measurement per unit time. The motor drive 102 may be varied as desired, however it is preferred to use a fan cooled synchronous reluctance AC ¼ horsepower motor, 220 volts, 60 cycle, 3-phase.

The present invention may be embodied in other specific forms without departing from the spirit or essential attributes thereof and, accordingly, reference should be made to the appended claims, rather than to the foregoing specification as indicating the scope of the invention.

What is claimed:

1. A gravimetric feeder comprising a housing divided into a control chamber and a belt chamber by a dust-type partition, a synchronous reluctance constant speed motor drive in said control chamber connected to an endless belt in said belt chamber, the top run of said belt being supported by a weighing table, said table including a plate pivotably supported at one end, the other end of said table being supported by a pneumatic weight transmitter, a belt frame, roller means for said endless belt being supported by said frame, said frame being disposed within said belt chamber, said pneumatic weight transmitter being supported by said frame between the top and bottom runs of said belt, an inlet hopper positioned to deliver granular material onto said belt adjacent said other end of said plate, a reciprocable gate valve for controlling flow from said hopper along said belt, said transmitter including means for offsetting the tare weight of said belt and plate, an outlet on said housing at the end of said belt remote from said hopper, and pneumatic means coupling said transmitter to said valve for automatically controlling the position of said valve in response to load changes, said pneumatic means including an actuator for the valve member of said gate valve.

2. A feeder in accordance with claim 1 wherein said housing includes a control panel, said regulator being adjustable at said panel, said weight transmitter including means for pneumatically adjusting the tare weight of said plate and belt at said panel, said pneumatic means including a guage at said panel for exhibiting the feed rate.

3. A feeder in accordance with claim 1 wherein said endless belt extends around roller means, said roller means including discontinuous segments with each segment being supported by a spoke extending from a hub.

4. A feeder in accordance with claim 1 including an apertured plate adjacent to and cooperable with said valve member for controlling flow of granular material.

5. A feeder in accordance with claim 1 wherein said pneumatic means includes adjusting means for adjusting belt tension and belt tracking, said adjusting means including an adjustable regulator coupled to pneumatic cylinders, each cylinder being coupled to a discrete pivotably mounted support, each support being connected to one end of a roller means supporting said belt, whereby belt tension is adjusted by causing the cylinders to pivot said supports.

6. A gravimetric feeder comprising a housing divided into a control chamber and a belt chamber by a dust-type partition, a synchronous reluctance constant speed motor drive in said control chamber connected to an endless belt in said belt chamber, the top run of said belt being supported by a weighing table, said table including a plate pivotably supported at one end and supported at its other end by a pneumatic weight transmitter, an inlet hopper positioned to deliver granular material onto said belt adjacent said other end of said plate, a gate valve for controlling flow from said hopper along said belt, said gate valve including a valve member mounted for vertical movement, said weight transmitter including means for offsetting the tare weight of said belt and plate, an outlet on said housing at the end of said belt remote from said inlet hopper, pneumatic means coupling said weight transmitter to said valve member for automatically controlling the position of the valve member in response to load changes, said pneumatic means including an actuator for said valve member, said pneumatic means including a controller for generating a corrective signal based on any deviation between feed rate set point and weight measurements by said weight transmitter, said controller being coupled to said actuator for the valve member through a double acting positioner, and feedback means coupled directly to said positioner and valve member.

7. A feeder in accordance with claim 6 wherein said valve member is supported at one end of pivotably mounted linkage, low friction bushings guiding vertical movement of said valve member, and said actuator being coupled to said linkage.

8. A gravimetric feeder comprising a housing divided into a control chamber and a belt chamber by a dust-type partition, a synchronous reluctance constant speed motor drive in said control chamber connected to an endless belt in said belt chamber, the top run of said belt being supported by a weighing table, said table including a plate pivotably supported at one end and supported at its other end by a pneumatic weight transmitter, an inlet hopper positioned to deliver granular material onto said belt adjacent said other end of said plate, a reciprocable gate valve for controlling flow from said hopper along said belt, said weight transmitter including means for offsetting the tare weight of said belt and plate, an outlet on said housing at the end of said belt remote from said inlet hopper, pneumatic means coupling said weight transmitter to said valve for automatically controlling the position of a valve member in said valve in response to load changes, said pneumatic means including an actuator for said valve member, and a frame supporting said endless belt and roller means for said belt, said frame being supported within said belt chamber on one side only in cantilever fashion so that the belt may be removed from the other side of the housing.

9. A gravimetric feeder comprising a housing, an endless belt within said housing, a constant speed motor drive in said housing coupled to said belt, a hopper for feeding dry granular material onto the top run of said belt, the top run of said belt being supported by a weighing table, said table including a plate pivotably supported at one end by a belt frame, the other end of said plate being supported by a pneumatic weight transmitter adjacent the outlet of said hopper, said transmitter being supported by said frame, said frame being disposed between the top and bottom runs of said belt, first and second roller means on said frame and supporting said belt, a pair of cylinders on said frame, each cylinder being coupled to a discrete pivotable support, each pivotable support being coupled to one end of said first roller means, said cylinders being fluid operated for adjusting the tension of said belt and the tracking of said belt by causing said supports to pivot.

References Cited

UNITED STATES PATENTS

| 2,447,594 | 8/1948 | Petersen | 222—55 |
| 2,797,075 | 6/1957 | Wilbur | 198—208 X |
| 2,889,030 | 6/1959 | Mottet | 222—55 X |
| 3,105,589 | 10/1963 | Conley et al. | 198—208 X |
| 3,187,944 | 6/1965 | Stock | 222—55 X |

FOREIGN PATENTS 712,893   8/1954   Great Britain.

ROBERT B. REEVES, Primary Examiner

H. S. LANE, Assistant Examiner

U.S. Cl. X.R.

198—230, 208